United States Patent [19]

Küfner et al.

[11] Patent Number: 4,621,932
[45] Date of Patent: Nov. 11, 1986

[54] FOUR-ROW CYLINDRICAL ROLLER BEARING FOR THE WORKING OR BACK-UP ROLLS OF HIGH-SPEED ROLLING STANDS

[75] Inventors: Walter Küfner; Heinrich Winter, both of Schweinfurt, Fed. Rep. of Germany

[73] Assignee: SKF GmbH, Schweinfurt, Schweinfurt, Fed. Rep. of Germany

[21] Appl. No.: 772,689

[22] Filed: Sep. 5, 1985

[30] Foreign Application Priority Data

Sep. 7, 1984 [DE] Fed. Rep. of Germany ....... 3432875

[51] Int. Cl.⁴ ............................................. F16C 19/28
[52] U.S. Cl. .................................... 384/569; 384/548; 384/560; 384/577
[58] Field of Search ............... 384/548, 572, 577, 578, 384/579, 580, 574, 569

[56] References Cited

U.S. PATENT DOCUMENTS

| 385,266 | 6/1888 | Hyatt | 384/548 |
| 491,585 | 2/1893 | Petterson | 384/579 |
| 2,130,258 | 9/1938 | Baker et al. | 384/574 |
| 3,499,200 | 3/1970 | Wilson | 384/572 |

*Primary Examiner*—Lenard A. Footland
*Attorney, Agent, or Firm*—Eugene E. Renz, Jr.

[57] ABSTRACT

Four-row cylindrical roller bearing for the working or back-up rolls of high-speed roll stands, in which, so that the rollers of all rows can roll evenly at high speeds without slippage, and also so that the bearing can be easily disassembled, the inner ring is provided with flanges on both sides of each row of rollers and, in the installed state, at least the two rows of rollers facing the roll body are each guided in a separate cage.

5 Claims, 1 Drawing Figure

FOUR-ROW CYLINDRICAL ROLLER BEARING FOR THE WORKING OR BACK-UP ROLLS OF HIGH-SPEED ROLLING STANDS

FIELD OF THE INVENTION

The present invention pertains to a four-row cylindrical roller bearing for the working or back-up rolls of high-speed rolling stands.

BACKGROUND OF THE INVENTION

Four-row cylindrical roller bearings are not new per se.

In the known four-row cylindrical roller bearings used to support the rolls in roll stands, the outer ring is provided with fixed flanges, and the inner ring is flangeless. There are also split outer ring designs wherein the two parts of the outer ring are provided with flanges and the inner ring is flangeless. In addition, each pair of adjacent rows of rollers is guided by a common cage as shown in West German Pat. No. 1,775,013.

These known designs have the disadvantage that, especially at high speeds, the rollers no longer roll properly in any of the rows, which means that, as a result of slippage and sticking damage can occur. These same forms of damage occur when, as a result of the common cage, the individual rows of rollers cannot roll along at the different peripheral velocities resulting from the different load relationships on the individual rows of rollers. The cage may be destroyed by the damage caused by this slippage. Finally, it requires great effort to remove and reinstall the known bearings when the rolls have to be reground, a frequent occurrence.

SUMMARY OF THE PRESENT INVENTION

The object of the present invention is to create a bearing of the type described above, in which it is ensured that the rollers of all rows can roll properly, even at high speeds and at different peripheral velocities, and that, when the rolls have to be reground or the bearing inspected, the bearing can be easily removed and reinstalled. To accomplish this, it is proposed in accordance with the present invention that the inner ring be provided with flanges on both sides of each row of rollers and that at least the two rows of rollers facing the roll body (in the installed state) are each guided in a separate cage.

Because the rotating inner ring is provided with flanges on both sides of each row of rollers, all the rollers are forced to roll, even at high speeds. As a result of the two rows of rollers facing the roll body being guided in separate cages, at least the two rows of rollers in which the greatest differences in peripheral velocity occur are permitted to roll at these different peripheral velocities, so that sticking or cage breakage will not occur.

As a result of the loose flange on the inner ring and the design of the cages as finger cages, the individual cages can be pulled out toward one side of the bearing after the outer ring and chock have been removed laterally. The rollers can then be removed from the pockets of the cages. The finger cages also have the advantage that because they require only a small amount of axial space, longer rollers can be used to produce a bearing with greater load-bearing capacity.

If the outer ring is provided at one axial end with a fixed flange and at the other axial end with a loose flange, additional axial bearings can be omitted, if desired, and the roll neck can be made shorter. Because this loose flange is installed on the outer ring at the opposite end of the bearing to that where the loose flange of the inner ring is located, once the loose flange has been removed the outer ring and the chock may be pulled off without difficulty.

BRIEF DESCRIPTION OF THE DRAWING

Further details of the present invention are described with reference to the accompanying drawing wherein.

DESCRIPTION OF THE PREFERRED EMBODIMENTS

Figure 1:
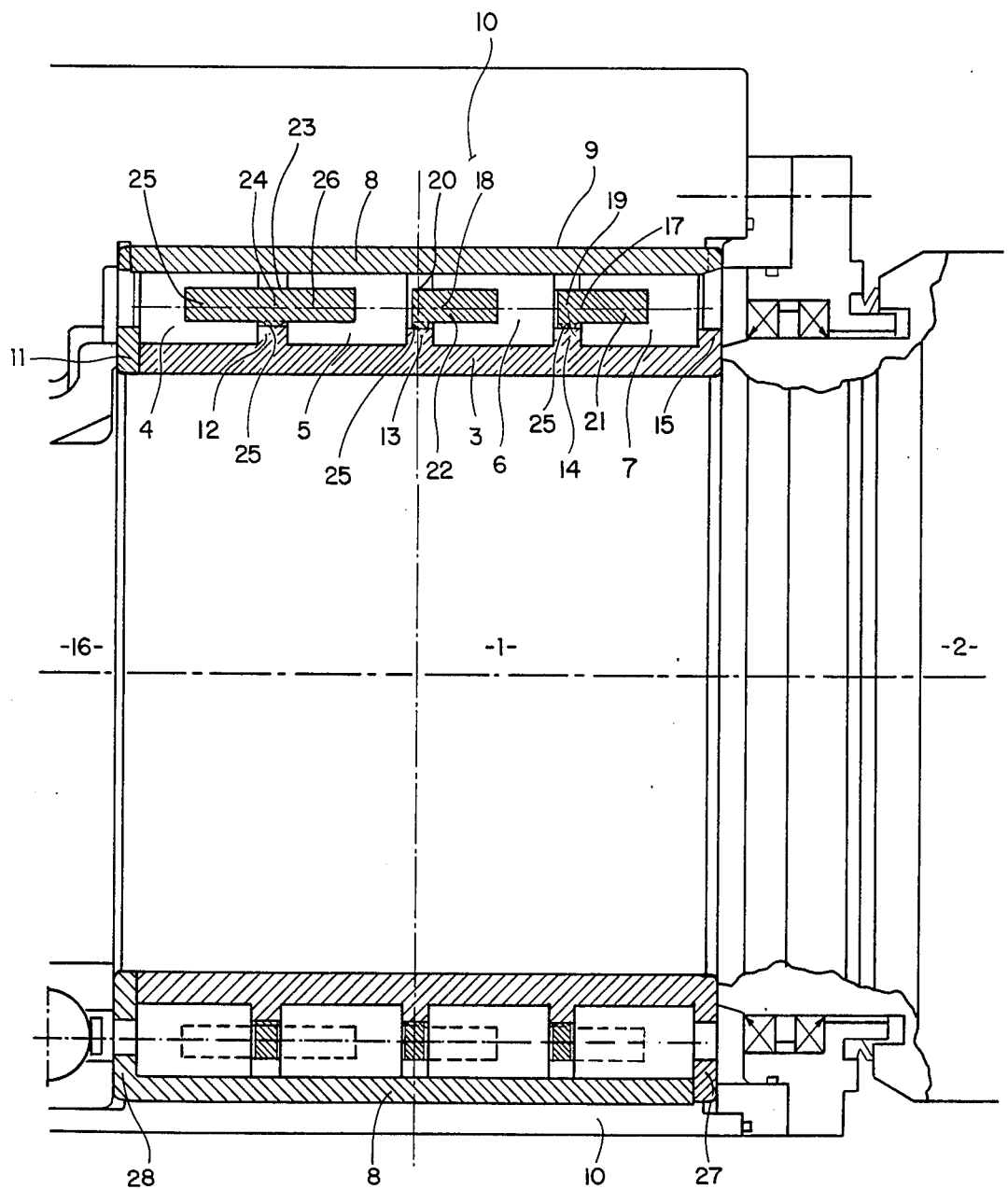
FIG. 1 is a sectional view in side elevation of the present invention such that the upper half of the FIGURE shows a design for a bearing for a roll of a rolling stand with a flangeless outer ring; and the lower half of the FIGURE shows a modified bearing with an outer ring provided with flanges.

As shown in the embodiment of the invention shown in the upper half of FIG. 1, an inner ring 3 of a four-row cylindrical roller bearing, having rows of rollers 4, 5, 6, 7, is attached to the roll neck 1 of the roll (not shown in detail) with roll body 2. An outer ring 8, common to these rows of rollers, is held in the bore 9 of the chock 10. Inner ring 3 is provided with flanges 11, 12, 13, 14, 15 on both sides of each row of rollers. Flange 11, which faces the end of the roll neck 16, is loose, and flanges 12-15 are formed as part of the single element comprising the inner ring 3. The rollers within the two rows 6, 7 facing roll body 2 are each guided in separate finger cages 17, 18. Finger cages 17, 18 are set up so that the rotating side rings 19, 20, from which the axial bars 21, 22 project, point toward the axial end of roll neck 16.

The rollers in rows 4 and 5 are guided in a common double finger cage 23, which has a side ring 24 and bars 25, 26 extending axially toward roll body 2 and roll neck 16. The double finger cage can, of course, be replaced by two separate finger cages, similar to the finger cages 17, 18, if measures are taken to ensure that the finger cage of the row of rollers facing the axial end of the roll neck 16 cannot escape laterally out of the bearing during operation.

Cages 17, 18, and 23 are guided on flanges 12, 13, 14 situated between the rows of rollers. Lubricating grooves 25 are provided to improve the lubrication between the surfaces in sliding contact in the bore of side rings 19, 20, 24.

Outer ring 8 of the bearing is designed without a flange in the upper half of FIG. 1, whereas the outer ring 8 of the bearing according to the embodiment shown in the lower half of FIG. 1 is provided with a loose flange 27 on the end facing the roll body 2, and a fixed flange 28 at the other end.

Considering now disassembly of the bearing, first the outer ring 8, together with chock 10, may be pulled out toward the left according to the top half of FIG. 1. After the loose flange 11 has been removed, the rollers of roller row 4 may be taken out toward the left side, according to FIG. 1, together with cage 23. Then, the rollers of roller row 5 may be removed. In the same way, cages 18, 17 may be pulled out one after the other with rows of rollers 6, 7. If desired, inner ring 3 can then be pulled off roll neck 1, e.g., by means of a known heating and pulling device. Assembly is performed in the reverse sequence.

The design according to the embodiment shown in the lower half of FIG. 1 may be disassembled generally in the same way. In this case, it is necessary merely to remove loose flange 27 before outer ring 8 is pulled off together with chock 10.

What is claimed is a:

1. Four-row cylindrical roller bearing comprising inner and outer spaced rings and a plurality of rows of rollers in the annular space between the rings, said inner ring having flanges (11, 12, 13, 14) on both sides of each row of rollers (4, 5, 6, 7) and in the installed state, at least two rows of rollers (6, 7) facing a roll body (2), each being guided in a separate cage.

2. Four-row cylindrical roller bearing according to claim 1, wherein one of the flanges of the inner ring (3), preferably the flange (11) facing the end (16) of the roll neck, is loose.

3. Four-row cylindrical roller bearing according to claim 1, wherein the separate cages comprise finger cages (17, 18), consisting of a side ring (19, 20) and connecting pieces (21, 22), which extend from the side rings in the axial direction, said cages being arranged in the bearing in such a way that the side rings (19, 20) face the end (16) of the roll neck.

4. Four-row cylindrical roller bearing according to claim 1, wherein the two rows of rollers (4, 5) facing the end (16) of the roll neck are arranged in a common double finger cage (23), which consists of a side ring (24) and connecting pieces (25, 26) extending from said double finger cage toward the end of the roll neck and the roll body (2) in the axial direction.

5. Four-row cylindrical roller bearing according to claim 1, wherein the outer ring (8) is provided at one axial end of the bearing with a fixed flange (28) and at the other axial end with a loose flange (27), said loose flange (27) of the outer ring (8) being situated at the opposite axial end to that where the loose flange (11) of the inner ring (3) is located.

* * * * *